United States Patent [19]

Boardman

[11] Patent Number: 4,563,926
[45] Date of Patent: Jan. 14, 1986

[54] CONVEYOR SYSTEM FOR SHEAR DISCHARGE

[75] Inventor: Peter W. Boardman, St. Catharines, Canada

[73] Assignee: Deere & Company, Moline, Ill.

[21] Appl. No.: 555,780

[22] Filed: Nov. 28, 1983

[51] Int. Cl.$^4$ .................. B21D 43/00; B23D 15/09
[52] U.S. Cl. .................................. 83/107; 83/153; 83/155; 83/157; 83/373; 198/690.1
[58] Field of Search ............. 83/107, 153, 155, 155.1, 83/157, 160, 373, 166, 648, 81, 82; 198/813, 817, 690, 679; 180/125; 474/134, 268

[56] References Cited

U.S. PATENT DOCUMENTS

| | | | |
|---|---|---|---|
| 417,512 | 12/1889 | Rosquist | 474/134 X |
| 2,286,603 | 6/1942 | Coumbe et al. | 198/817 |
| 2,950,815 | 8/1960 | Oberg | 198/817 X |
| 3,209,892 | 10/1965 | Jones | 198/817 X |
| 3,459,082 | 8/1969 | Smith et al. | 83/160 X |
| 3,486,602 | 12/1969 | Zuercher | 198/817 |
| 3,613,821 | 10/1971 | Kerr et al. | 180/125 |
| 3,670,611 | 6/1972 | Jarman | 83/81 |
| 3,760,668 | 9/1973 | Spaulding | 83/157 X |
| 3,815,403 | 6/1974 | Daniels | 83/71 X |
| 3,866,498 | 2/1975 | Jarman | 83/89 |
| 3,870,140 | 3/1975 | Wieser | 198/817 |
| 4,109,543 | 8/1978 | Foti | 474/268 X |
| 4,273,501 | 6/1981 | Terry | 180/125 X |
| 4,313,357 | 2/1982 | Hawkins | 83/373 X |
| 4,344,341 | 8/1982 | Lotz | 83/81 X |
| 4,372,538 | 2/1983 | Balfanz | 198/690 X |
| 4,381,686 | 5/1983 | Ess | 83/157 X |

FOREIGN PATENT DOCUMENTS 2512361  3/1983  France .................... 83/155

OTHER PUBLICATIONS

Continental MDM brochure.

*Primary Examiner*—James M. Meister

[57] ABSTRACT

A shear discharge conveying system including a plurality of individual conveying belt modules connectd to a main frame for easy repair and replacement. Impact bar assemblies are spaced between the modules to prevent sheared material from impacting directly on the belts. Rows of vertically extending and retracting gauging supports are adjustable to match the cut size, and tension links connected between the rows prevent the material from nosing down between supports. A scrap gripping and conveying mechanism moves strips of scrap transversely to the conveying direction directly behind the shear before the strips can contact and foul the conveyor. The main frame is mounted on air pads so a single operator can move the entire system to and from the shear.

48 Claims, 17 Drawing Figures

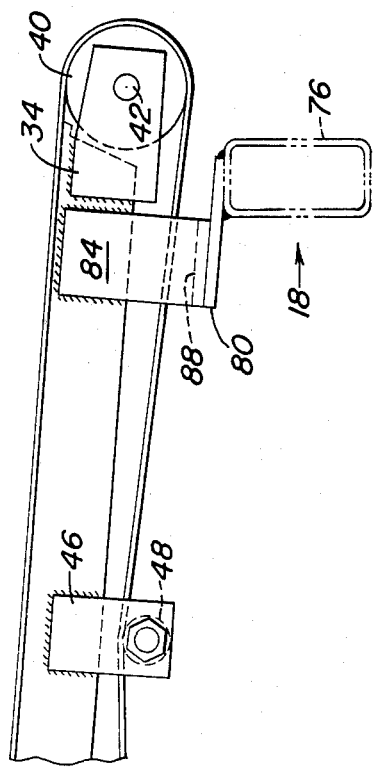
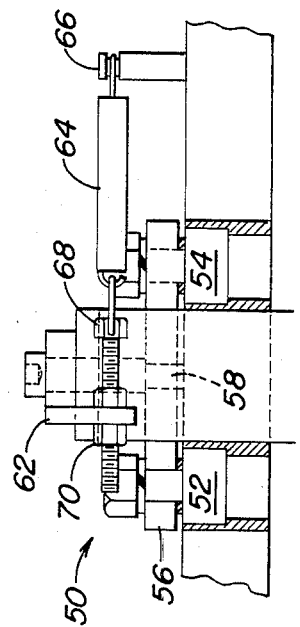
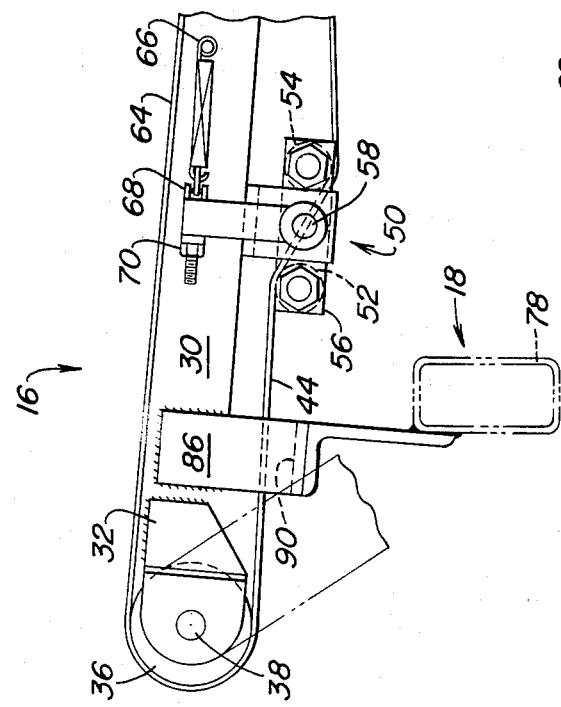
FIG. 6
FIG. 7

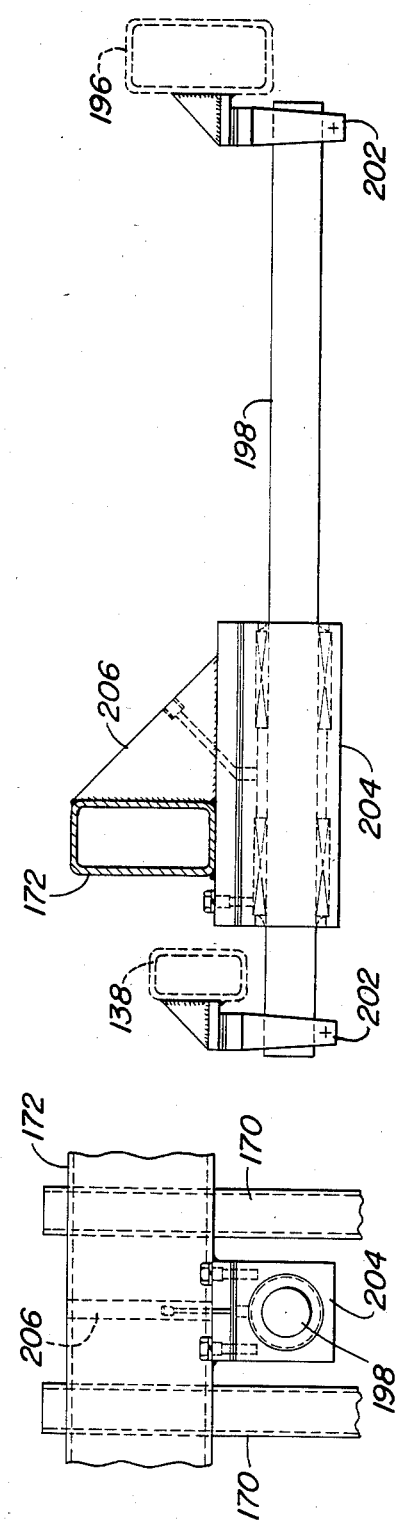

CONVEYOR SYSTEM FOR SHEAR DISCHARGE

BACKGROUND OF THE INVENTION

The present invention relates generally to a metal shear and more specifically to an improved metal shear discharge conveyor system.

Presently available shear discharge conveying systems such as shown in U.S. Pat. No. 3,670,611 issued to David J. Jarman, include a conveyor unit for moving metal from the shear blade to a stacker. The conveyor unit includes a plurality of heavy chains with welded flights. The impact of sheared metal falling unretarded onto the flights or forces resulting from edges of metal getting under the flights causes flights to break, chain sprockets to misalign, and links to separate as pins break. Link pins also fail prematurely because of insufficient lubrication and twisted chains resulting from sideway or the jumping of a sprocket by an insufficiently tensioned chain. A twisted chain and broken pins also result from the sliding action of sheared metal against the flights, and excessive drag causes the pins to break. Repair of broken flights and pins is very expensive and time-consuming. Broken flights must be repaired or replaced with new flights and welded back onto the chain. Replacing pins requires two men since the chains weigh up to one hundred pounds each; to either install a new chain or bring the ends of the chain back together to install a pin requires substantial effort.

Another problem encountered with shear conveying systems is adequately supporting metal during the sizing operation. Previous devices include sets of arms that rock upwardly from below the level of the chain conveyor flights. The tops of the arms support rollers that rotate about a transverse axis only so that any side traversing of the metal being sheared is prevented. Since the metal cannot be moved sideways on the rollers, some sizing operations become very difficult to perform. The angled arm construction also scissors or catches the scrap pieces as the arms come down after the scrap has been sheared. Another problem with the pivoting arm arrangement is that the arms occupy a fixed position and cannot move fore-and-aft for sizing different sized of cuts of steel. In addition, if light gauge metal is being sheared, the edge of the metal will nose down between the support rollers and as a result can be improperly sized, thereby resulting in wasted time, effort and material.

Previously available shear conveying systems are typically quite heavy units which are mounted on wheels. To move the units for repair or maintenance work usually requires a forklift truck. Utilizing a forklift truck to pull the conveyor in and out often results in damage to the floor adjacent the conveyor and damage to the conveyor itself as it is lifted by the forklift.

It is therefore an object of the present invention to provide an improved discharge conveying system for a shear. It is a further object to provide such a system which is more reliable and easier to repair than at least most previous discharge systems.

It is another object of the present invention to provide a shear discharge conveying system which eliminates heavy chains and welded flights. It is a further object of the invention to provide such a system which reduces or eliminates conveyor damage as a result of sheared metal falling on the conveyor carriage, chains or belts. It is yet another object to provide such a system which prevents misalignment of the conveyor or slack in the conveyor that would otherwise cause it to break or malfunction. It is still a further object to provide such a system having substantially lower maintenance costs than previous systems.

It is a further object of the invention to provide a shear discharge conveying system which prevents sheared metal from falling directly on the conveyor carriage, chains or belts and which also prevents the metal from working its way underneath portions of the conveyor. It is a further object to provide such a system which reduces failures associated with insufficient lubrication of the conveyor and wherein the conveyor produces reduced drag on the metal to reduce drag-related conveyor failure. It is another object to provide such a system with a conveyor which will maximize the amount of grab exerted by the conveyor on the sheared material for efficient conveying of the material.

It is still another object of the invention to provide a shear discharge conveying system having an improved sizing support. It is a further object to provide such a system which eliminates scissoring or catching of scrap pieces and which prevents light gauge metal from nosing down between the gauging supports.

It is still a further object of the invention to provide an improved discharge conveying system for a shear having an improved scrap removing device. It is a further object to provide such a system which prevents scrap material from contacting or fouling the conveyor.

It is yet another object of the present invention to provide a metal shear discharge conveyor system which may be more easily moved to and from its conveying position adjacent the back of a shear. It is a further object to provide such a system which can be moved and easily repaired by one man.

In accordance with the above objects, the shear discharge conveying system of the present invention includes a belt-type conveyor system which is used in place of the chain and flight-type conveyors. Belt conveyors are provided in module form which permits easy removal from the conveyor for maintenance purposes by a single man. Each module includes a belt, two end supported crown pulleys or drums, a belt support track, a belt tensioner, two module support brackets attached by bolts to the frame and couplings for the forward crown pulley drive shaft. Heavy chains with belts and flights are thereby eliminated, and lower maintenance expenses will result since each module can be easily removed by unbolting two brackets to remove the whole module, or the belt may be replaced by disconnecting a pulley drive shaft coupler to insert a new belt over the drive pulleys. As the brackets are reconnected or the drive shaft is recoupled, there is positive alignment of the pulleys. A belt tensioner is provided to automatically take up any slack in the belt, and the use of nylon-type belts reduces drag on the metal. A hydraulic drive is utilized so that the belts can be run at variable speeds to maximize the grab exerted on cut steel.

To reduce damage to the conveyor caused by sheared material falling on the belts, impact bars are placed between the conveyor modules. The impact bars are elevated above the level of the conveying surfaces during shearing process to catch falling steel. After the steel drops to the impact bars, they are lowered so that the steel comes in contact with the top of the modules where the belts convey the sheared material away from the shear in a preselected direction. Located between the modules are vertically extendible and retractable support arms, each having a ball roller at the top portion thereof. Two rows of arms are transversely aligned and extend across the conveyor to provide support for the pre-cut steel. Two hydraulic cylinders raise the front row of supports and another two cylinders raise the rear row of supports, independently or in unison. A tie bar is used to connect all of the front supports and another tie bar is used to connect all of the rear supports. The rear row of support arms may be moved fore-and-aft to accommodate different sizes of metal. Automatically adjustable length chains intermediate the supports serve to prevent light material from nosing downward between the arms during sizing. The ball support configuration permits easy traversing of the metal, and since the supports are moved vertically, no scissoring can occur to jam the arms. The fore-and-aft movement of the rear row of supports permits the supports to be adjusted to match the cut size.

Air pads are mounted on the four corners of the conveyor frame for raising the conveyor on an air cushion. Air from a compressed air supply line is attached to the air pad supports. The supports are cup-shaped and provide a layer of air on which the conveyor can float so that one man can move it in and out from the shear to perform maintenance.

A scrap gripping mechanism is provided at the shear end of the conveyor to grip sheared metal and convey it transversely to the direction of the conveyor belts. The gripping mechanism prevents scrap material from contacting the conveyor and getting caught between sections of the conveyor.

These and other objects, features and advantages of the present invention will become apparent to those skilled in the art from the description which follows and from the drawings.

BRIEF DESCRIPTION OF THE DRAWINGS

FIG. 6 is a side view of a portion of a belt module connected to the main conveyor frame.

FIG. 7 is an enlarged plan view of the belt tensioning device utilized with the belt module of FIG. 6.

FIG. 16 is a side view of the sliding beam arrangement utilized to support the rear posts of the gauging support.

FIG. 17 is an end view of a portion of the sliding beam arrangement of FIG. 16.

DESCRIPTION OF THE PREFERRED EMBODIMENT

Figure 1:
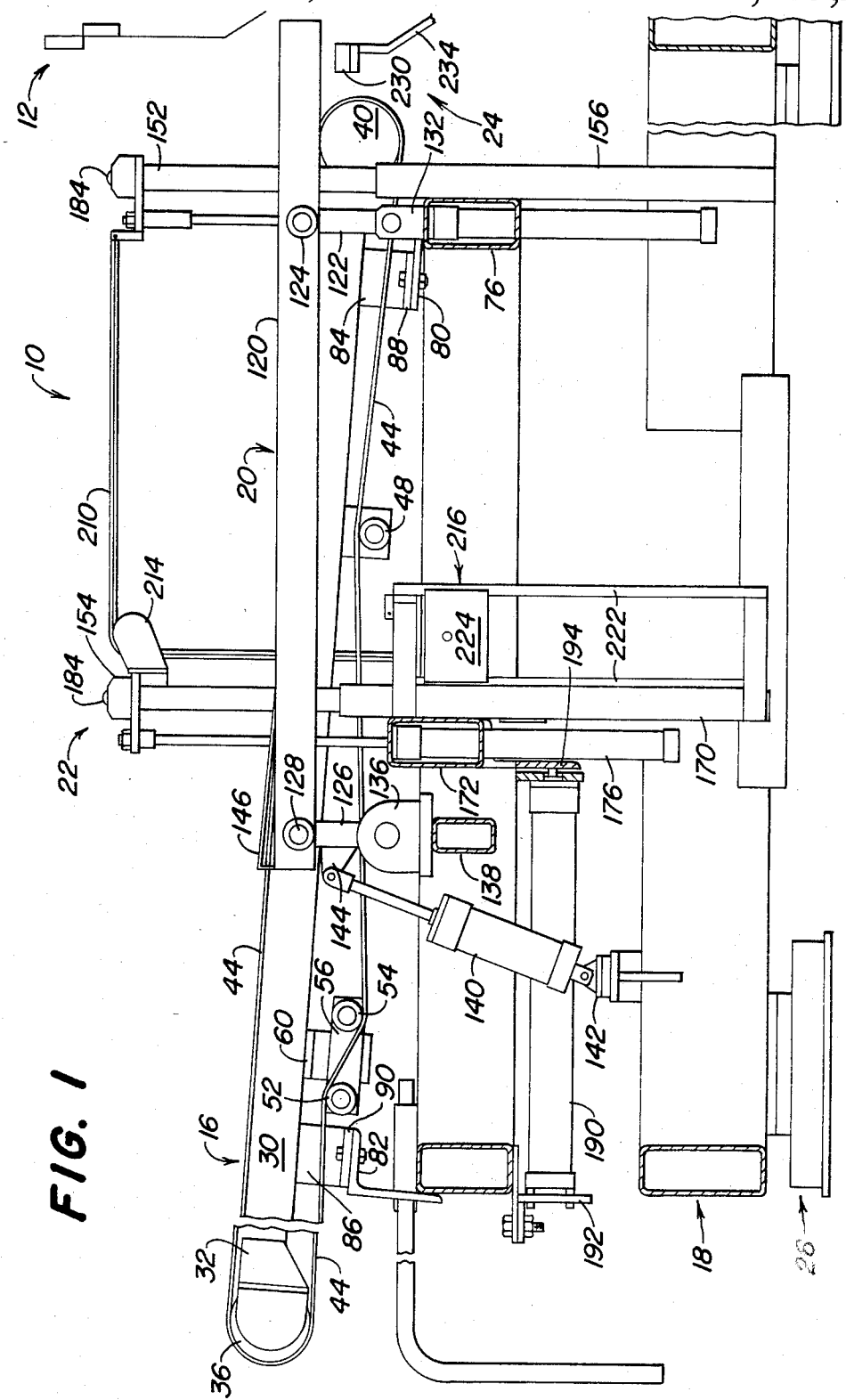
FIG. 1 is a side view of the shear discharge conveying system of the present invention.

Referring now to FIG. 1, therein is shown a shear discharge conveying system 10 constructed in accordance with the principles of the present invention and supported adjacent the back side of a conventional shear 12. The conveying system 10 includes a plurality of elongated conveying modules 16 supported in side-by-side relationship generally parallel to each other on a main conveyor frame 18 with the axes of the modules running generally perpendicular to the shear blade of the shear 12. Rockably supported from the main frame 18 between the conveying modules 16 are a plurality of impact bar assemblies 20 for preventing sheared material from dropping directly on the conveying module 16. The conveying system 10 further includes vertically extendible and retractable gauging support structure 22 for supporting material to be cut in the shear 12 while the material is being positioned with respect to the shear. A movable scrap gripping and conveying mechanism 24 is supported adjacent the shear 12 and can be moved vertically from the position shown in FIG. 1 to a position adjacent the shear blade to grip scrap material and move it generally in the direction parallel to the shear blade away from the conveying module 16. The main frame 18, which is generally rectangular in shape, is supported at its four corners by air pads 26 which are connected to a source of compressed air (not shown) when it is necessary to move the entire conveying system 10 away from the shear 12 so that the system 10 can float on a layer of air for easy movement by a single person.

Each conveying module 16 includes an elongated module frame 30 (FIGS. 1 and 6). A drive pulley bracket 32 is welded to the side of the frame 30 at the end thereof opposite the shear. The other end of the frame 30 supports an idler pulley bracket 34 which is also welded to the side of the frame 30. A drive pulley 36 is mounted for rotation with a short drive shaft 38 rotatably supported and extending through the bracket 32. The side of the drive pulley 36 facing inwardly into the plane of the drawing of FIG. 6. is unencumbered with any frame structure that would hinder placement of a belt on the pulley. An idler pulley 40 is supported for rotation about an axis parallel to the axis of rotation of the drive pulley 36 by an idler shaft 42 connected to the idler pulley bracket 34. In a manner similar to that of drive pulley 36, the inwardly directed side of the idler 40 is unencumbered with any frame structure.

A relatively narrow, continuous loop belt 44, fabricated from nylon-reinforced plastic, is trained around the drive pulley 36, over the frame 30 and around the idler pulley 40. The top of the frame 30 defines a substantially planar belt support track extending between the outer circumference of the pulley 36 and the outer circumference of the pulley 40.

A plate 46 is welded to the outwardly facing side (FIG. 6) of the module frame 30 and supports an idler roller 48. The belt 44 is trained over the roller 48 and through a belt-tensioning mechanism 50 which is supported from the frame 30. The belt-tensioning mechanism 50 includes a pair of rollers 52, 54 spaced fore-and-aft for rotation about parallel axes on a rockable arm member 56 pivotally connected at 58 to an angle bracket 60 connected to the bottom of the module frame 30. A bar 62 extends upwardy from the pivot location 58 and is fixed to the arm 56. The bar 62 is urged in the clockwise direction (FIG. 6) by a spring 64 stretched between a post 66 extending outwardly from the frame 30 and an adjusting bolt 68 fixed by nuts 70, 72 to the bar 62. The belt is trained under roller 54 and over the roller 52. The spring 64 urges the roller 54 downwardly and the roller 52 upwardly to take up any slack in the belt 44. The tension may be adjusted by repositioning the adjusting nuts 70 and 72 on the adjusting bolt 68.

Figure 2:
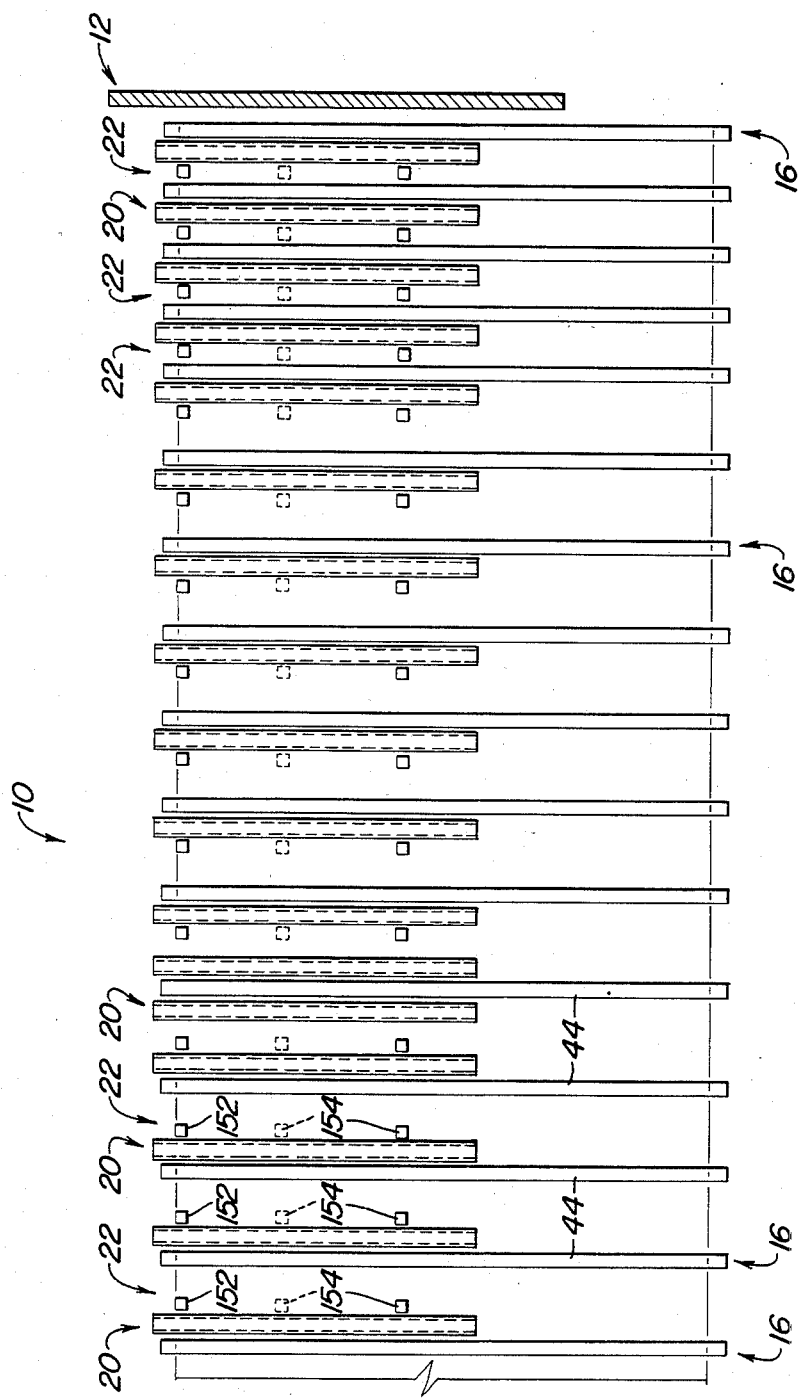
FIG. 2 is a top view shown schematically of a portion of the conveying system of FIG. 1 illustrating the relative locations of the belt conveyor modules, impact bars, and front and rear support pillars for gauging material to be sheared.

The main support frame 18 includes a front beam 76 and a rear beam 78. A support plate 80 extends rearwardly from the top of the beam 76 at each desired module location across the main frame 18. An angle bracket 82 is welded to the back of the beam 78 and extends upwardly therefrom in alignment with each support plate 80. Welded to the outer face (FIG. 6) of each module frame 30 are a front support bracket 84 and a rear support bracket 86 with angled portions 88 and 90 respectively adapted to be supported by the plate 80 and angle bracket 82, respectively. Each module 16 is connected to the frame 18 by inserting bolts through the plate 80 and angled portion 88 and through the angle bracket 82 and angle portion 90. By removing the bolts and disconnecting the shaft 38, the entire module 16 may be lifted from the frame 18. The above-described belt support arrangement also permits the belt 44 to be removed simply by releasing tension from the belt and slipping the belt off of the pulleys 36 and 40. A drive coupler, discussed in detail later, is removed from the driveshaft 38 to permit the belt to be completely removed from the system 10 without removing the module 16. As best seen in FIG. 2, numerous modules are equally spaced across the width of the main frame 18 with the spacings between the modules being substantial as compared with the width of the belts 44. The modules 16 are angles slightly upwardly from the shear end to the discharge end (FIG. 1) so that the conveying surface defined by the belts 44 riding on the support track surface formed by the top of the frames 30 defines a conveying plane substantially horizontal in the transverse direction but rising slightly in the direction of conveying. The shear end of the conveying plane lies substantially below the shear plane of the shear 12.

Figure 8:
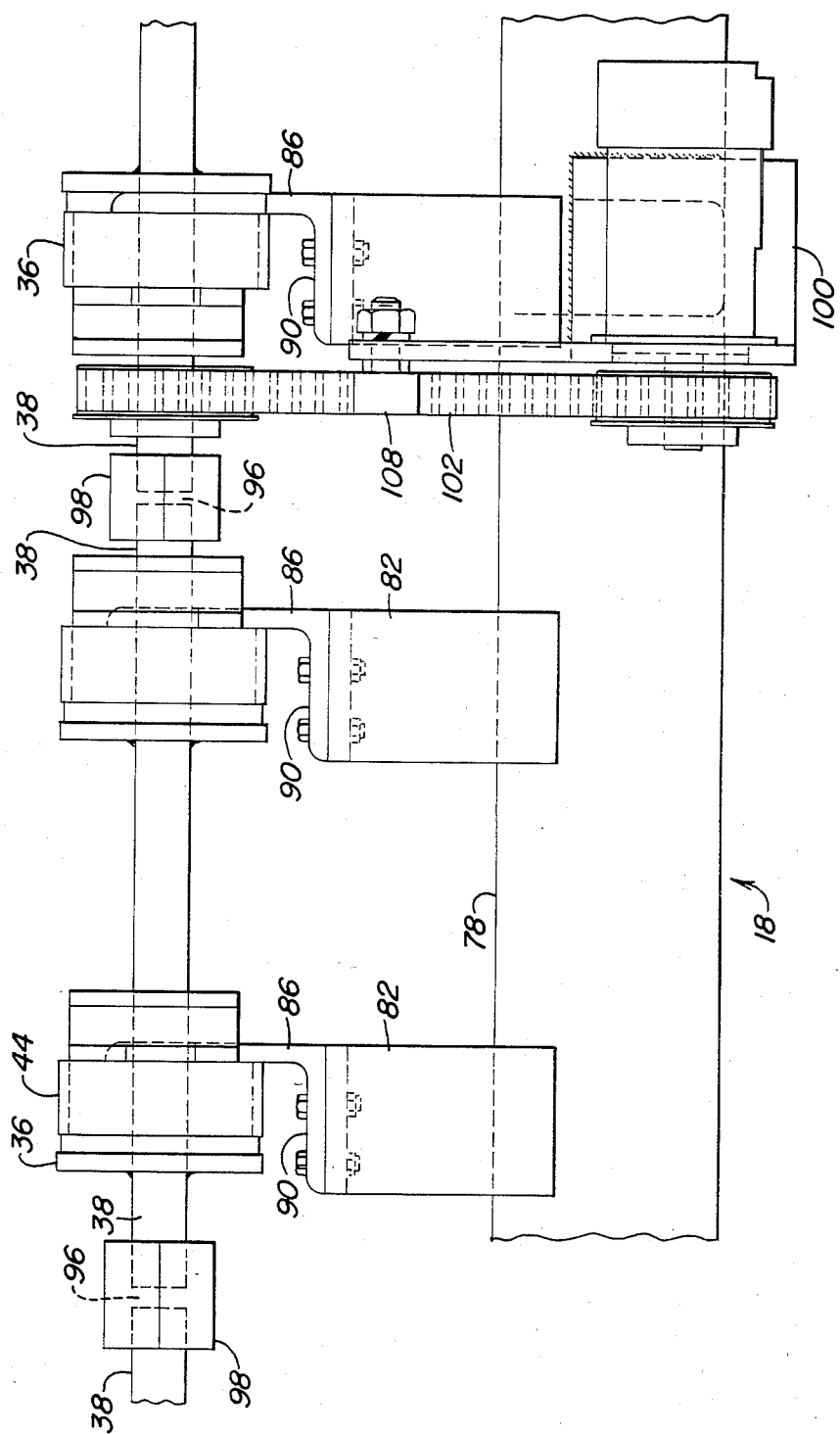
FIG. 8 is an enlarged end view of the belt drive arrangement.
Figure 9:
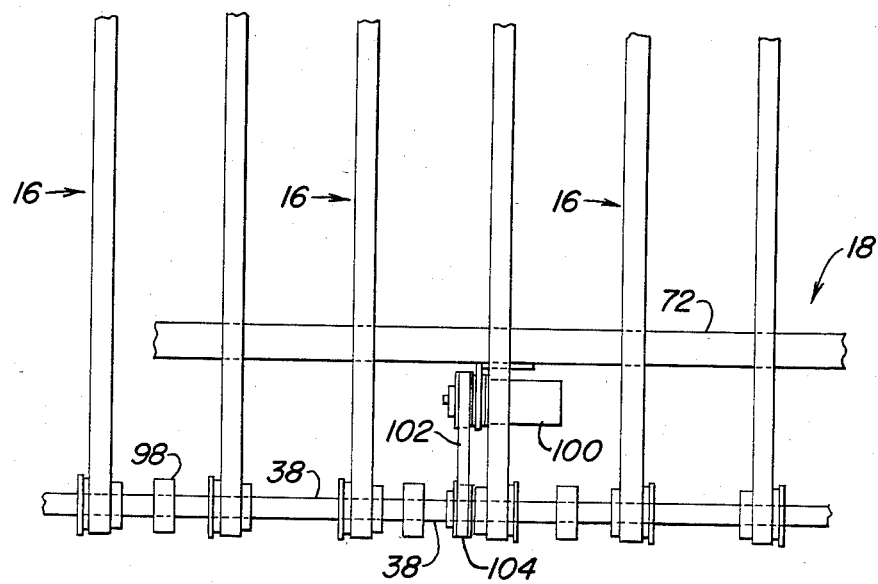
FIG. 9 is a top view of a portion of the conveyor belt modules and drive therefor.
Figure 10:
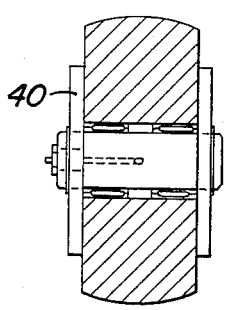
FIG. 10 is a view, partially in section, of the idler pulley located adjacent the shear side of the conveyor module.
Figure 11:
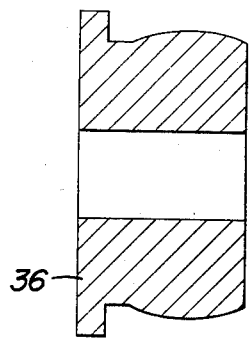
FIG. 11 is a cross-sectional view of the belt pulley for the discharge end of the conveyor module.
Figure 12:
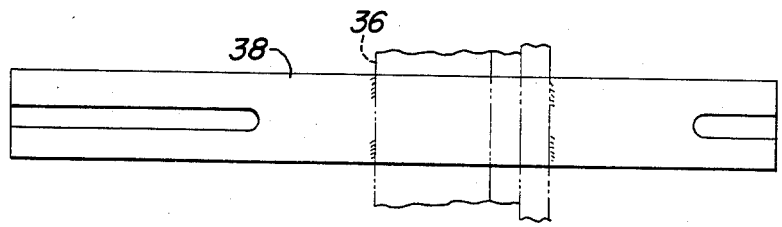
FIG. 12 is an enlarged view of a portion of the belt drive shaft shown in FIG. 9.

As best seen in FIG. 8, adjacent ends of the drive shafts 38 which are connected to the drive pulleys 36 are offset to provide a gap 96 between the shafts, which are axially aligned. A conventional split coupler 98 extends across the gap and is connected to the adjacent ends of the drive shafts 38 to drivingly couple all the shafts across the width of the conveying system 10. A variable speed motor 100 is fixed to the transverse beam 78 and drives a belt 102 which is trained around a driven pulley 104 fixed for rotation with one of the shafts 36 on one of the inner modules 16. The belt 44 for a given module 16 may be removed easily by simply splitting the coupler 98 on the unencumbered side of the module, that is, the side facing into the plane of the paper on FIG. 6, so that the belt may be slipped off the pulleys and passed through the gap 96 (FIG. 8) provided between the adjacent ends of the shafts 38. An adjustable idler 108 is provided for tensioning the slack side of the belt 102.

Figure 3:
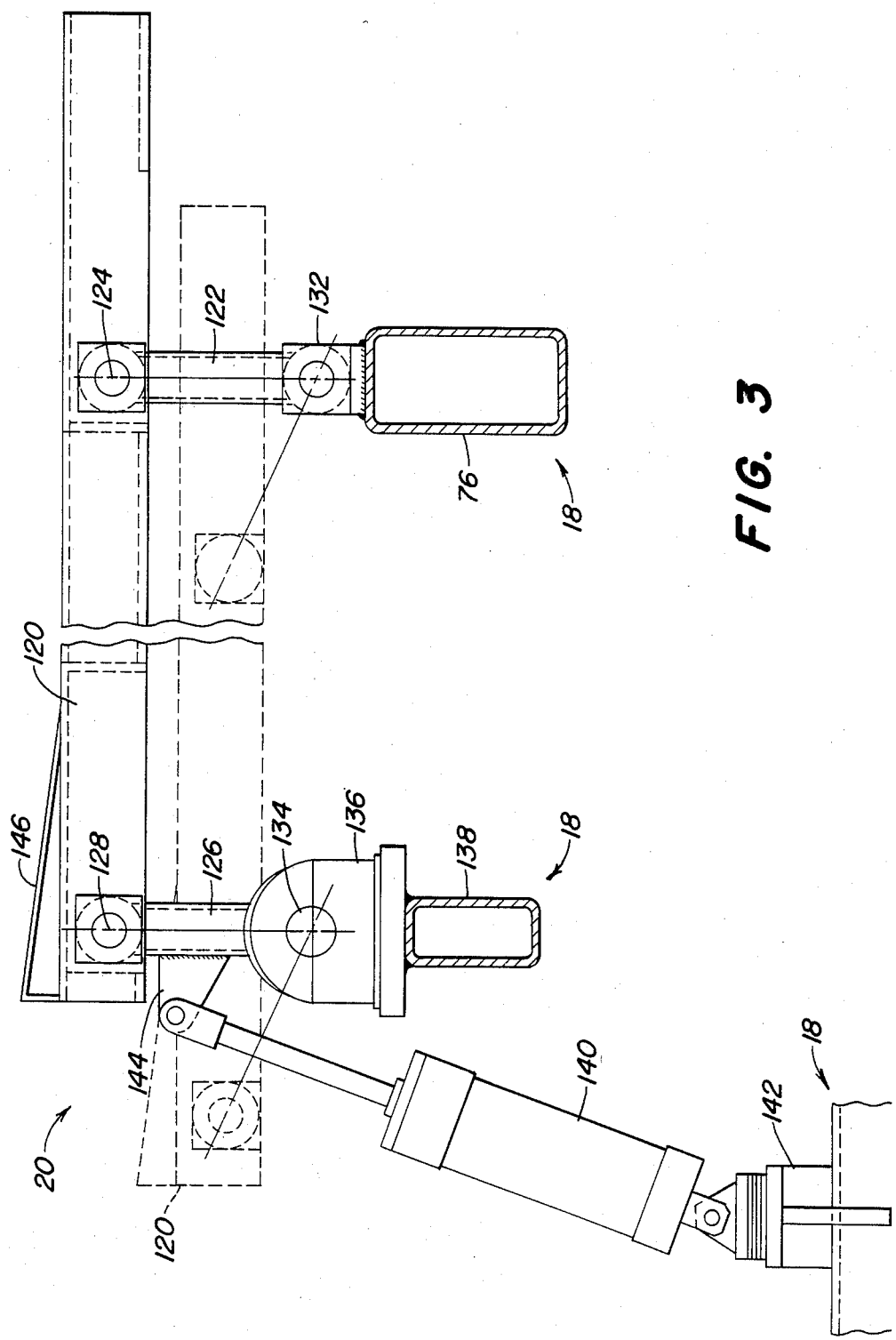
FIG. 3 is an enlarged view of one of the impact bar assemblies utilized with the conveyor of FIG. 1.
Figure 5:
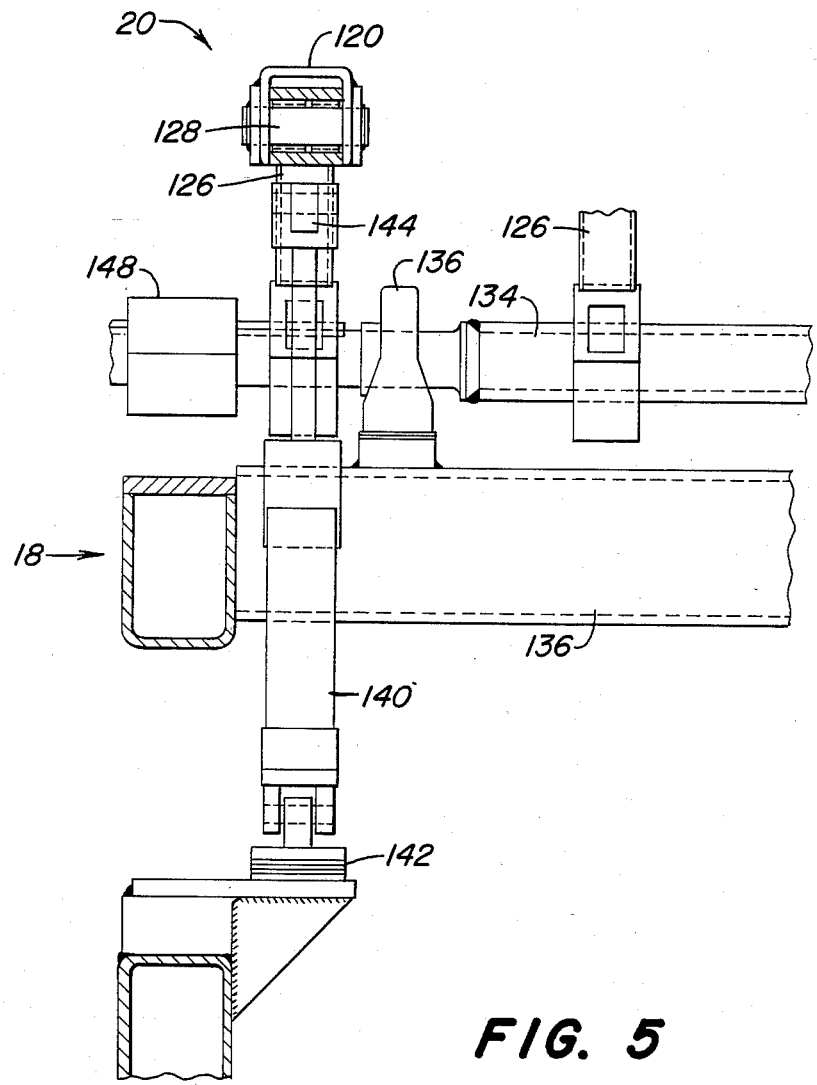
FIG. 5 is an enlarged end view of a portion of the impact bar assembly shown in FIG. 3.

In the preferred embodiment, an impact bar assembly 20 is located between adjacent conveying modules 16 (FIG. 2). Referring to FIGS. 1, 3 and 5, each impact bar assembly 20 includes an elongated bar 120 running parallel and adjacent the conveying module 16. The bar 120 is generally rectangular in cross section and is pivotally connected adjacent its forward end (shear end) to an upright arm 122 by a pivot extending between the sides of the bar 120. An upright arm 126 is pivotally connected to the aft end (discharge end) of the bar 120 by a similar pivot 128. The lower end of the forward arm 122 is pivotally connected to the main frame 18 by a pivot bracket 132 welded to the top portion of the front transverse beam 76. The aft arm 126, which is somewhat shorter than the forward arm 122, is pivotally connected to the main conveyor frame 18 by a pivot bearing 136 bolted to a central transverse beam 138. As best seen in FIGS. 1 and 3, the arms 122 and 126 form four-bar linkage type structure with the bar 120 and the frame 18. A hydraulic cylinder 140 has its base end connected to a bracket 142 connected to the lower portion of the main frame 18. The rod end of the cylinder 140 is connected to a cylinder bracket 144 which in turn is welded to one of the aft arms 126. The transverse drive shaft 134 is fixed for rotation with the arm 126 which is connected to the cylinder 140, and the remaining arms 126 of the other impact bar assemblies 20 are fixed to the shaft 134 for rotation in unison. Extension of the cylinder 140 rotates the arms 122 and 126 in the clockwise direction about their pivotal connections with the frame 18 to the raised position shown in FIGS. 1 and 5 and by the solid lines in FIG. 3. The transverse drive shaft 134 constrains the aft arms 126 to rotate in unison so that the bars 120 rise uniformly above the conveying plane defined by the belts 44 on the module 16. An inclined deflector 146 is connected to the aft end of the bar 120 and as best seen in FIG. 1, runs parallel to a central portion of the belt 44 to provide protection for the belt 44 in that area when longer lengths of material are being sheared. When the bars 120 are in their raised positions, the deflector 146 extends slightly above the level of the conveying plane. Once the sheared material has impacted on the bars 120, the cylinder 140 is retracted to move the bars in unison to their lowered or retracted position (FIG. 3) below the level of the conveying plane. As the arms 122 and 126 are rocked in the counterclockwise direction about their pivotal connections with the frame 18, the bars 120 gradually lower the sheared material onto the moving belts 44. Since the conveying plane is inclined upwardly in the direction of discharge, and since the arm 122 is slightly longer than the arm 126, the leading end of the sheared material will be gradually lowered onto the moving belts 44 before the shear end of the material contacts the belt so that a smooth gripping action is provided. The variable speed motor 100 may also be slowed as the material contacts the belt to increase the gripping action provided by the belts against the sheared material to be conveyed. The impact bar assemblies 20 are movably mounted on the main frame 18 in such a manner as to be non-interfering with the elongated conveying modules 16 so that the modules may be easily repaired or removed without hindrance from the bar assemblies 20. In the preferred embodiment, the transverse drive shaft 134 is fabricated from a plurality of individual shafts joined by conventional split couplers 148 similar to those utilized to connect the short drive shafts 38 on the belt drive arrangement. The couplers are generally split cylinders joined together by screws and including a key way to provide positive drive. To disconnect a drive shaft, the screws are removed from the couplers and the couplers are split to open up the gap between the shafts.

The vertically extending and retracting gauging supports 22 are located adjacent the impact bar assemblies 20 between the conveying modules 16. The gauging supports 22 are also mounted from the frame 18 in non-interfering relationship with the modules 16 so that the modules may be repaired or replaced independently of the supports 22. The gauging supports 22 include a plurality of transversely aligned front support posts or pillars 152 and a like number of rear support posts or pillars 154 aligned in the direction of conveying with the corresponding front posts 152. The rows of posts 152 and 154 are adjustable with respect to each other to accommodate different sizes of materials during gauging. Each front support post 152 includes a square tubular receiving member 156 fixed to the beam 76 of the frame 18. A telescoping member 158 is slidably received within the member 156. A cylinder 160 is connected to the beam 76 adjacent the post 152 and includes a rod end 162 connected to a horizontal bracket 164 welded to the top of the member 158. The tubular receiving member 156 is vertically slotted, and a guide member 166 is connected to the lower end of each telescoping member 158 and moves in the slot as the cylinder 160 is extended and retracted to raise and lower the members 158. The members 166 are connected by a tie bar 167 so that the members 158 are moved vertically together with activation of the cylinder 160. In similar fashion, each rear post 154 includes a telscoping member 168 received within a vertically slotted tubular member 170 fixed to a transverse beam 172. The telescoping member 168 includes a lower guide member 174 received by the slot. The members 174 are connected by a tie bar 175 so that the members 168 are also raised and lowered as a group. The transverse beam 172 supports a cylinder 176 adjacent the post 154. The cylinder 176 includes a rod end 178 connected by a horizontal bracket 180 to the top of the telescoping member 168. Each of the posts 152 and 154 supports a ball-roller assembly 182 on top of the respective brackets 164 and 180. The assemblies 182 include an upwardly projecting ball 184 for supporting sheet metal during gauging operations and for permitting the metal to be adjusted in any direction on the posts 152 and 154 when they are extended. The row of rear posts 154 is movable with respect to the front row of posts 152 between a widely spaced position (solid lines in FIG. 2) for gauging large sheets of metal, and a narrowly spaced position (dotted lines) for gauging smaller pieces of metal. Preferably two cylinders 160 and two cylinders 176 are utilized, and the two rows of posts 152 and 154 can be raised independently or in unison.

Figure 4:
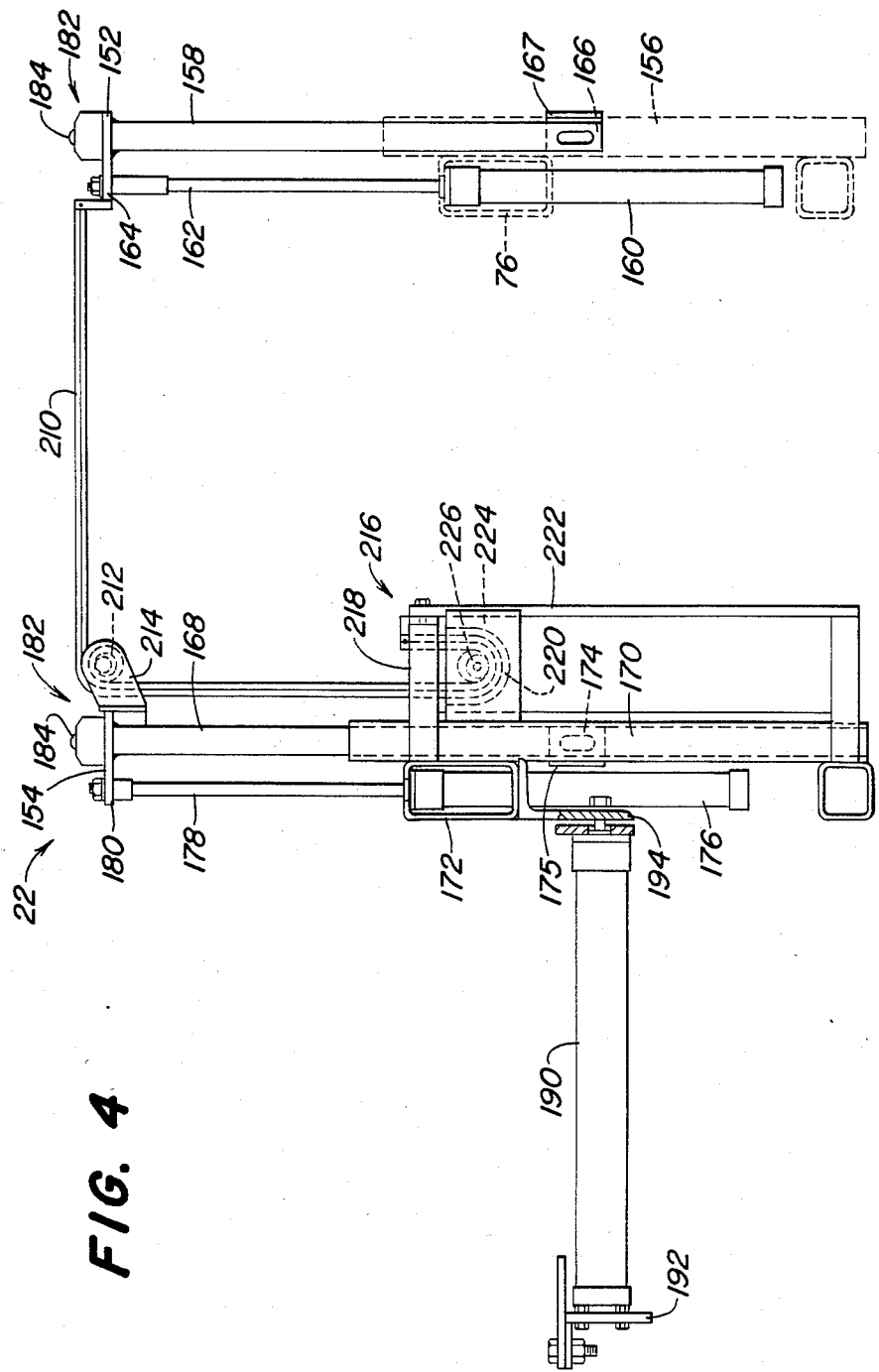
FIG. 4 is a side view of the adjustable gauging support assembly of the conveyor system of FIG. 1.

Referring to FIGS. 1 and 4, a hydraulic cylinder 190 has its base end connected by a bracket 192 to the frame 18. The cylinder is supported generally horizontally and parallel to the axis of the conveying module 16 and includes a rod end connected by a bracket 194 to the beam 172. The beam 172 is mounted for movement with respect to the frame 18 is a direction parallel to the module 16 so that as the cylinder 190 is extended, the row of posts 154 will be moved closer to the row of posts 152, while retracting the cylinder 190 will move the rows further apart. To accommodate movement of the beam 172 parallel to the axes of the modules 16, a sliding beam arrangement is connected between the central transverse beam 138 and a forward transverse beam 196 is provided. A pair of spaced, circular bars 198 is connected by brackets 202 to the beams 138 and 196, respectively. Bearing blocks 204 are slidably mounted on the bars 198 and the beam 172 is welded to the blocks 204. A traingular plate 206 is welded between one face of the beam and the top of the block 204 for added support.

To prevent material, especially light material, from nosing downwardly between the posts 152 and 154, a flexible tension link 210 is connected to the bracket 164 on the post 152 and extends rearwardly and over a roller 212 mounted on a bifurcated bracket 214 which is fixed to the upper end of the post 154. The link 210 extends downwardly from the roller 212 to a take-up block assembly 216 which maintains the link 210 tensioned between the posts 152 and 154 and automatically takes up the link as the cylinder 190 is adjusted to change the distance between the posts. The take-up block assembly 216 includes a bracket 218 fixed to the transverse beam 172 and supporting the end of the tension link 210 in such a manner that a loop 220 is formed in the link. Vertical guide bars 222 extend downwardly from the bracket 218 and slidably support a weighted block 224 for vertical movement. The block 224 is captured within the loop 220 by a roller 226 connected to the block. As the cylinder 190 is extended from the position shown in FIG. 4, the weight of the block 224 against the loop 220 maintains the tension link 210 tight between the posts 152 and 154 and automatically takes up the excess portion of the link. Preferably the tension link 210 is bicycle-type chain which in its tensioned condition extends generally horizontally at approximately the same level as the top of the rollers 184 on the posts 152 and 154. The take-up block assembly 216 also maintains the link 210 tight as the cylinders 160 and 174 are extended and retracted to raise and lower the posts 152 and 154, respectively.

Figure 15:
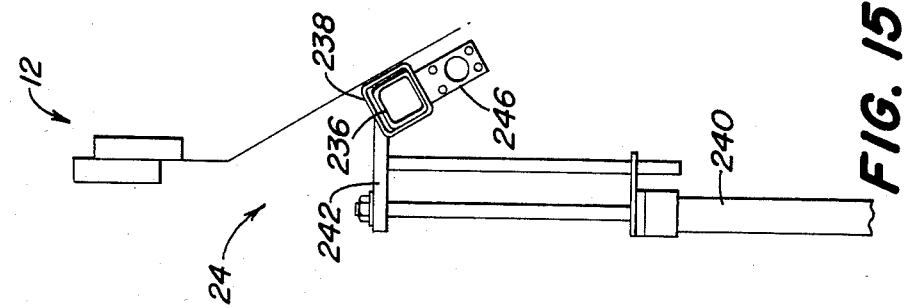
FIG. 15 is a view similar to FIG. 14, but showing more clearly the vertical adjusting member and the sliding beam arrangement of the gripping mechanism.
Figure 14:
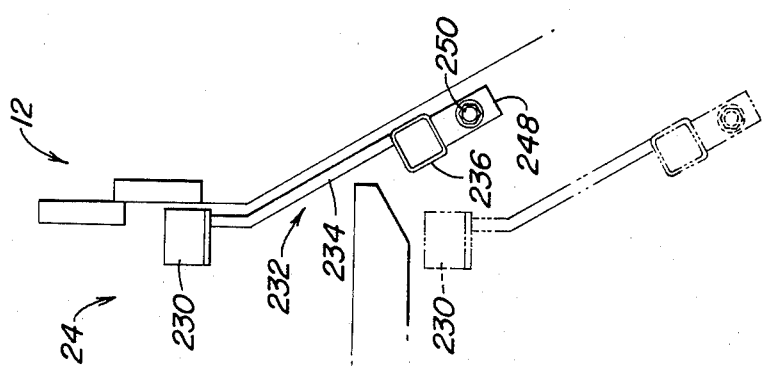
FIG. 14 is an end view of the mechanism of FIG. 13 showing the relative positions of the mechanism when it is in its raised operative position and its lowered retracted position.
Figure 13:
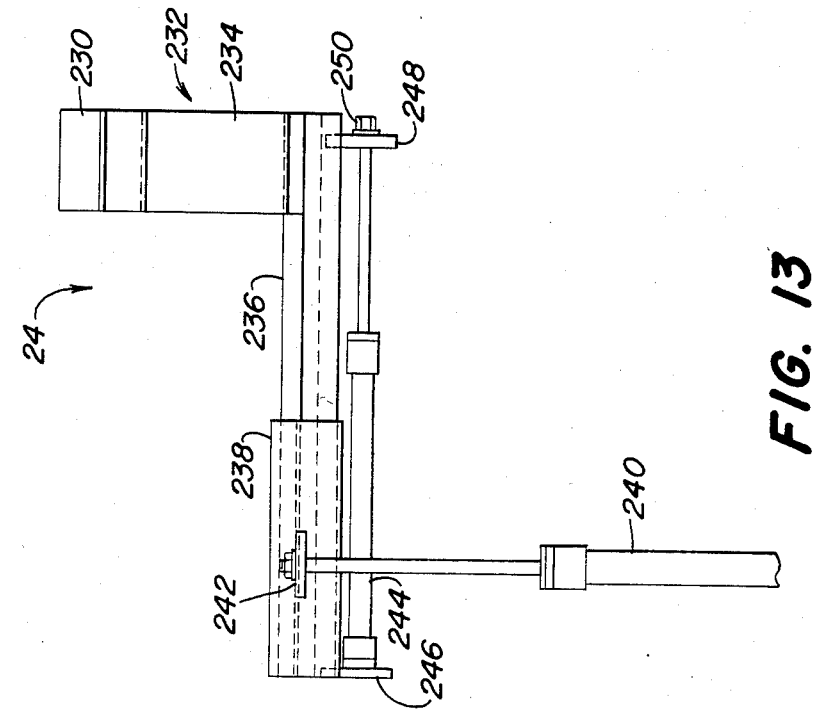
FIG. 13 is a front view of the scrap gripping and conveying mechanism utilized with the system of FIG. 1.

The movable scrap gripping and conveying mechanism 24 is movable between a retracted position, shown by the broken lines in FIG. 14, to a raised position as shown by the solid lines in FIG. 14 immediately adjacent the back of the shear 12. The magnetic head 230 is supported on a carriage arm 232 which includes an angled plate 234. As best seen in FIG. 14, the plate 234, when the head 230 is raised to the operative position, conforms generally to the shape of the rear of the shear 12 and lies closely adjacent to the shear with the head 230 directly under the shear blade at dwell on breakthrough. The angle plate 234 is welded to the top corner of a sliding beam 236 having a generally square cross section and slidingly received wthin a slightly larger tubular beam 238. The beam 238 is supported for vertical movement closely adjacent the rear side of the shear 12 by a pair of cylinders 240 transversely spaced along the back side of the shear. Each cylinder 240 is conected to the beam 238 by a bracket 242 welded to the front corner of the beam 238. The carriage arm 232 is movable transversely; that is, in and out of the plane of the FIGS. 14 and 15, by a horizontal disposed cylinder 244 fixed at its base end to the beam 238 by a bracket 246. The rod end of the cylinder 244 is connected to a bracket 248 welded to the end of the sliding beam 236 adjacent the attachment thereto of the magnetic carriage arm 232. The rod end of the cylinder 244 is secured to the bracket 248 by a nut and washer indicated at 250.

Prior to a narrow piece of scrap being cut from the metal sheet by the shear 12, the cylinders 240 are extended to raise the magnetic gripping head 230 closely adjacent the shear line as shown in FIG. 14 by the solid lines. The head 230 grips the metal strip as it is sheared from the remainder of the sheet. Once gripped by the head 230, the cylinder 244 is activated to slide the beam 236 within the corresponding beam 238 to move the strip of scrap transversely away from the shear 12. The mechanism 24 prevents scrap material from contacting the conveying surface and moves the scrap towards the side of the main conveying frame 18 where it may be rolled into scroll removed by another conveyor or otherwise compacted and deposited into a scrap bin. A scrap-scrolling mechanism which may be utilized with the present invention is described in my co-pending application entitled "SCRAP SCROLLER FOR A SHEAR DISCHARGE CONVEYING SYSTEM", filed concurrently herewith and assigned to the assignee of the present invention.

In operation, the rear row of support posts 154 is positioned by the cylinder 190 according to the size of the sheet material to be sheared. The rows of posts 152 and 154 are raised so that the roller balls 184 lie in a generally horizontal plane aligned with the plane of the shear 12. The posts 152 and 154 support the metal during gauging operations and permit the sheet to be moved easily in any direction for proper gauging. The tension links 210 extending between the rows of posts prevent the ends of the sheets, particularly thin sheets, from nosing down between the rows. The impact bars 120 of the impact bar assemblies 20 are raised above the level of the conveying plane defined by the conveying module 16 by extending the cylinder 140 and rotating the arms 122 and 126 to their vertical positions. The rows of posts 152 and 154 are then lowered and the shear 12 is activated. The sheared metal sheet impacts directly on the bars 120 with the force of impact being transferred through the upright arms 122 and 126 to the main frame 18 of the conveying system 10. When large sheets of metal are being sheared, the deflector 146 prevents the portion of the sheet closest to the discharge end of the conveyor from contacting the conveying modules 16. Upon impact of the metal against the bars 120, the cylinder 140 is retracted so that the arms 122 and 126 rotate downwardly and move the impact bars 120 below the conveying plane so that the sheared metal sheet is contacted by the rotating belts 44 with the discharge end of the sheet contacting the belts first. The speed of the drive motor 100 is adjusted to provide maximum gripping on the sheet which is moved by the belts 44 to the discharge end of the conveyor where the sheets are stacked or otherwise processed.

In the event a belt 44 requires replacement, the corresponding coupler 98 is removed from between the drive shafts 38 to expose the gap 96. The belt 44 is simply removed from the crown pulleys 36 and 40, the tensioning rollers 52 and 54 and the idler roller 48 and is pulled through the gap 98. A new belt may easily be inserted by reversing the procedure, and then the split coupler 98 is reconnected across the gap 96 to reestablish the drive connection for the shafts 38. An individual module may be easily removed by removing the appropriate split coupler or couplers 98 and removing the bolts from the brackets 80 and 88 and 82 and 90 respectively. The module 16 in question can therefore be removed from the main frame 18 independently of the other modules and independently of the impact bar assemblies 20, gauging support structure 22 and movable scrap gripping and conveying mechanism 24. Most all maintenance and repairs of the conveying system 10 can be completed easily and relatively effortlessly by a single operator. By supplying compressed air to the air pads 26, one man can move the complete main frame 18 with all attachments connected thereto away from the back side of the shear 12.

Having described the preferred embodiment, it will be apparent that modifications can be made without departing from the scope of the invention as defined in the accompanying claims.

I claim:

1. A metal shear discharge conveying assembly for conveying sheared material, comprising:
   a plurality of self-contained, elongated conveying modules, each module comprising an elongated module frame, a pair of opposed end support pulleys rotatably supported at opposite ends of the module frame for rotation about axes transverse to the axis of the frame, said module frame including an upwardly directed support surface extending between the pulleys, a drive shaft extending axially from one of the pulleys, and a belt trained around the pulleys and over the upwardly directed support surface;
   a main conveyor frame supported adjacent the shear;
   module support bracket means for releasably supporting the individual modules in spaced side-by-side relationship on the main conveyor frame with the drive shafts generally aligned and the portion of the belts above the support surfaces defining a sheared material transport area which extends below the shear;
   means coupling the drive shafts together in driving relation when the modules are supported on the main frame by the bracket means while selectively permitting individual modules to be uncoupled, said support bracket means when released permitting the entire corresponding conveying module to be lifted from the main frame independently of any modules which remain supported on the main frame; and
   drive means drivingly coupled to the shafts to rotate the pulleys and thereby drive the belts.

2. The invention as set forth in claim 1 wherein the modules are releasably supported in transversely spaced relationship, said conveying assembly further comprising a plurality of elongated movable impact bar means, means supporting the impact bar means between and parallel to the modules in non-interfering relationship with respect to the modules for permitting the individual modules to be released and lifted from the main frame while the impact bar means are supported by the main frame, said bar means movable between a retracted position generally below the support surfaces and an extended position generally above the support surfaces for preventing sheared material from impacting directly on the continuous belts when extended, and means located below the modules and connected to the bar means for moving the bar means to lower the sheared material onto the belts after impacting on the bar means.

3. The invention as set forth in claim 1 including a plurality of vertically extendible and retractable material support pillars located between the modules adjacent the shear, said pillars including upper supports which when the pillars are in the extended position support the metal prior to shearing, said pillars including a pair of pillars spaced apart in the direction of advancement of the material, and flexible means extending between said pair of pillars for preventing material from nosing downwardly between said pillars.

4. The invention as set forth in claim 1 including means for preventing scrap material from contacting the modules and means for moving the scrap material transversely to the axes of the modules adjacent one end of the modules.

5. The invention as set forth in claim 1 including air cushion means connected to the main conveyor frame for raising the frame on a cushion of air to thereby permit the frame to be easily moved away from the shear.

6. The invention as set forth in claim 1 wherein the module includes belt tensioning means connected to the module frame for taking up slack in the belt.

7. The invention as set forth in claim 6 wherein the belt tensioning means comprises:
a roller support member rockably connected to the module frame, a pair of rollers spaced on the support member and aligned with the belt, said belt passing over one of the rollers and under the other of the rollers, and means for adjustably biasing the support member to cause said rollers to tension the belt.

8. The invention as set forth in claim 1 wherein the means coupling the drive shafts includes means for selectively providing a gap in the drive shaft adjacent a module to permit the belt to be replaced while the modules remain supported in fixed side-by-side relationship on the main conveyor frame.

9. The invention as set forth in claim 8 wherein the drive shafts are axially spaced, and wherein the means for providing a gap includes a split coupling member selectively attachable to and removable from the shafts.

10. The invention as set forth in claim 9 wherein the conveying module frame supports the pulleys on one axial side of the pulleys so that the opposite side is unencumbered with support structure to permit the belt to be removed completely therefrom, and said gap is located on said opposite side to permit the belt to be removed from or mounted on the assembly through the gap.

11. The invention as set forth in claim 10 wherein the belt comprises a continous, flightless loop fabricated from nylon-reinforced plastic, and the pulleys comprise crown pulleys.

12. The invention as set forth in claim 10 wherein the drive means includes variable speed motor means for driving the belts at variable speeds to maximize grab exerted on the cut material by the belts.

13. The invention as set forth in claim 1 wherein the conveyor frame includes a pair of spaced support beams extending transversely to and below the module axes, and wherein the module support bracket means includes a pair of brackets extending downwardly below the module and connected to opposite ends of the module frame and to the respective beams.

14. The invention as set forth in claim 13 wherein the brackets are each releasably connected by a bolt to the respective support beam.

15. A shear discharge conveying assembly for conveying sheared material from a shear, comprising:
a main conveyor frame;
a conveyor including a plurality of spaced and self-contained elongated conveying modules releasably connected to the frame in parallel relation defining a conveying surface adjacent the shear for moving cut material in a preselected direction from the shear to a location away from the shear;
a plurality of bars interposed in non-interfering relationship between the conveying modules and shiftable vertically with respect to the modules between a raised operative position and a retracted position, wherein the bars in the raised position extend above the conveying surface and below the shear, and in the retracted position are below the conveying surface; and
means shifting the bars to the raised position for causing sheared material to impact on the bars, and to the retracted position after the sheared material impacts on the bars to lower the material onto the conveying modules, said means shifting including a rockshaft member extending under and transversely to the modules to permit the modules when released to be lifted from the frame.

16. The invention as set forth in claim 15 wherein the conveying members comprise continuous belts carried on the modules.

17. The invention as set forth in claim 15 further comprising extendible and retractable material gauging supports located between the conveyor modules, and means for extending the supports to a position generally aligned with the shear to support material for gauging prior to shearing, and to a position below the conveying surface prior to the impacting of the cut material on the bars.

18. The invention as set forth in claim 16 wherein the bars are elongated and run parallel to the direction of travel of the belts.

19. The invention as set forth in claim 18 wherein the conveyor includes a main conveyor frame and a pair of upright arms, each arm pivotally connected at one end to the conveyor frame and at the opposite ends to the bar in such a manner as to form four-bar linkage structure with the frame and bar, and wherein the rockshaft member is connected to the lower end of one of the arms.

20. The invention as set forth in claim 19 including means for attaching and removing each individual module to and from the main frame independently of the remaining modules.

21. The invention as set forth in claim 15 including scrap removal means located adjacent the shear for moving scrap material generally transversely to the preselected direction wherein the scrap removal means includes a vertically and transversely movable scrap gripping portion movable between a first position located adjacent the shear and above the conveying surface and a second position below the conveying surface and near the side of the conveyor, and means for moving the gripipng portion between the first and second positions.

22. The invention as set forth in claim 19 wherein the means for rocking the arms comprises: a cylinder connected to one of the arms of one of the bars.

23. A shear discharge conveying assembly for conveying sheared material from a shear, comprising:
   conveyor means located below the plane of the shear for receiving sheared material and conveying the material in a preselected direction away from the shear;
   means for supporting the material above the conveyor means while the material is positioned in the shear, said means including a first row of vertically movable support posts located adjacent the shear, and a second row of support posts;
   means for moving the rows of support posts relative to each other to accommodate positioning of different sizes of material in the shear; and
   means for moving the support posts vertically between an upper support position wherein the upper ends lie generally in a plane corresponding to the shear plane, and a lower retracted position below the conveyor means.

24. The invention as set forth in claim 23 wherein the upper ends include ball transfer means for permitting free positioning of the material in any direction parallel to the plane when the support posts are in the upper support position.

25. The invention as set forth in claim 23 including means extending between two of the posts for preventing material from nosing downward between said posts when in the upper support position.

26. The invention as set forth in claim 25 wherein the distance between said two posts is adjustable, and the means extending between the two posts is a flexible adjustable length member tensioned therebetween.

27. The invention as set forth in claim 23 including connecting means supported between at least one of the posts in the first row and a post in the second row for preventing material being positioned in the shear from nosing down between the rows.

28. The invention as set forth in claim 27 including means for automatically adjusting the length of the connecting means as the rows are adjusted relative to each other.

29. The invention as set forth in claim 23 wherein the conveyor means includes a plurality of individual elongated conveyor modules and means releasably connecting the modules in parallel and spaced relationship, and wherein the support posts are located between and supported independently of the modules.

30. The invention as set forth in claim 23 including a movable connecting beam attached to one of the rows of support posts, and wherein the means for moving the posts includes power means connected to the beam for moving the beam relative to the other of the rows of support posts.

31. The invention as set forth in claim 27 wherein the connecting means is connected to one of the posts and the other of said posts includes pulley means for directing the flexible member, and take-up means located below the pulley means and connected to the connecting means for maintaining the connecting means taut between the posts.

32. The invention as set forth in claim 31 wherein the take-up means includes a vertical guide, means for holding the flexible member in a loop within the guide, and weighted means slidable vertically within the guide and captured within the loop for urging the loop downwardly to tension the connecting means.

33. The invention as set forth in claim 29 further comprising scrap removal means located adjacent the shear for moving scrap material transversely to the axis of the modules.

34. The invention as set forth in claim 29 further including a plurality of elongated impact means spaced between the modules adjacent the posts for preventing sheared material from impacting directly on the conveyor means.

35. The invention as set forth in claim 34 wherein the impact means include vertically movable bars supported in parallel relationship between the modules, and means located generally below the modules for selectively moving the bars between a raised position above the conveyor means and a retracted position below the conveyor means.

36. A shear discharge conveying assembly for conveying sheared material and sheared material scraps from the back side of a shear, said assembly comprising:
   conveyor means located below the plane of the shear for receiving sheared material at the back of the shear and conveying the material a preselected direction away from the shear;
   a movable scrap gripping mechanism located adjacent the back of the shear;
   means for moving the scrap gripping mechanism vertically between a retracted position adjacent the shear end of the conveyor means out of interfering relationship with sheared material being conveyed and an extended position above the conveyor means closely adjacent the back side of the shear;
   wherein said scrap gripping mechanism includes means for gripping pieces of scrap from the back side of the shear when said mechanism is in the extended position to prevent the scrap from contacting the conveyor means; and
   means for moving gripped scrap transversely to the preselected direction away from the conveyor means.

37. The invention as set forth in claim 36 wherein the means for moving gripped scrap includes means for moving the scrap gripping mechanism transversely to the preselected direction adjacent the back side of the shear.

38. The invention as set forth in claim 37 wherein the means for moving gripped scrap includes
   a vertically extendible and retractable cylinder;
   a guide member connected for movement vertically with the cylinder;
   a slide member supported by the guide member for movement with respect thereto transversely to the preselected direction; and
   means for moving the slide member.

39. The invention as set forth in claim 38 wherein the means for moving the guide member includes a second cylinder connected between the slide member and the guide member and movable vertically with the first-mentioned cylinder.

40. The invention as set forth in claim 37 wherein the scrap gripping mechanism includes a magnet.

41. The invention as set forth in claim 36 wherein the conveyor means comprises a plurality of individual belt modules, a frame, and means releasably securing the belt modules to the frame in side-by-side relationship for mounting and dismounting of individual modules to and from the frame independently of the scrap gripping mechanism.

42. The invention as set forth in claim 41 further comprising elongated impact means spaced between the modules and spaced from the scrap gripping mechanism in the preselected direction for preventing sheared material from impacting directly on the conveyor means.

43. The invention as set forth in claim 41 further comprising a plurality of vertically movable posts supported between the belt modules, and means for moving the posts between an upper support position wherein the upper ends of the posts are generally aligned horizontally with the shear, and a lower position below the belt modules.

44. A shear discharge conveying assembly for conveying sheared material, comprising:
- a plurality of self-contained, elongated conveying modules, each module comprising a pair of opposed end support pulleys, an elongated module frame rotatably supporting the pulleys at opposite ends thereof for rotation about axes transverse to the axis of the frame, said module frame including an upwardly directed support surface extending between the pulleys, a drive shaft extending axially from one of the pulleys, and a belt trained around the pulleys and over the upwardly directed support surface;
- a main conveyor frame supported adjacent the shear;
- module support bracket means for releasably supporting the individual modules in spaced side-by-side relationship on the main conveyor frame with the drive shafts generally aligned and the portion of the belts above the support surfaces defining a sheared material transport area which extends below the shear;
- means coupling the drive shafts together in driving relation when the modules are supported on the main frame by the bracket means while selectively permitting individual modules to be released from the main frame independently of any modules which are supported on the frame;
- drive means drivingly coupled to the shafts to rotate the pulleys and thereby drive the belts; and
- a plurality of vertically extendible and retractable material support pillars located between the modules adjacent the shear, said pillars including upper supports which when the pillars are in the extended position support the metal prior to shearing, said pillars including a pair of pillars spaced apart in the direction of advancement of the material, and flexible means extending between said pair of pillars for preventing material from nosing downwardly between said pillars.

45. A shear discharge conveying assembly for conveying sheared material from a shear, comprising:
- conveyor means located below the plane of the shear for receiving sheared material and conveying the material in a preselected direction away from the shear;
- means for supporting the material above the conveyor means while the material is positioned in the shear, said means comprising a plurality of vertically movable support posts having upper ends;
- means for moving the support posts vertically between an upper support position wherein the upper ends lie generally in a plane corresponding to the shear plane, and a lower retracted position below the conveyor means;
- means extending between two of the posts for preventing material from nosing downward between said posts when in the upper support position, said means extending including a flexible adjustable length member tensioned between said posts; and
- means for adjusting the distance between said two posts.

46. The invention as set forth in claim 45 wherein the flexible member is connected to one of the posts and the other of said posts includes pulley means for directing the flexible member, and take-up means located below the pulley means and connected to the flexible member for maintaining the flexible member taut between the posts.

47. The invention as set forth in claim 46 wherein the take-up means includes a vertical guide, means for holding the flexible member in a loop within the guide, and weighted means slidable vertically within the guide and captured within the loop for urging the loop dowwardly to tension the flexible member.

48. A shear discharge conveying assembly for conveying sheared material from a shear, comprising:
- conveyor means located below the plane of the shear for receiving sheared material and conveying the material in a preselected direction away from the shear;
- means for supporting the material above the conveyor means while the material is positioned in the shear, said means comprising a plurality of vertically movable support posts having upper ends;
- means for moving the support posts vertically between an upper support position wherein the upper ends lie generally in a plane corresponding to the shear plane, and a lower retracted position below the conveyor means; and
- wherein the upper ends include ball transfer means for permitting free positioning of the material in any direction parallel to the plane when the support posts are in the upper support position.

* * * * *

UNITED STATES PATENT AND TRADEMARK OFFICE
CERTIFICATE OF CORRECTION

PATENT NO. : 4,563,926

DATED : 14 January 1986

INVENTOR(S) : Peter W. Boardman

It is certified that error appears in the above-identified patent and that said Letters Patent is hereby corrected as shown below:

```
Claim 11, line 2, change "continous" to -- continuous --;
claim 38, combine lines 2 and 3; and claim 47, lines 5 and
6 change "dowwardly" to -- downwardly --.
```

Signed and Sealed this

Thirteenth Day of May 1986

[SEAL]

*Attest:*

*Attesting Officer*

DONALD J. QUIGG

Commissioner of Patents and Trademarks